United States Patent
Zushi et al.

(10) Patent No.: US 7,235,332 B2
(45) Date of Patent: Jun. 26, 2007

(54) LITHIUM ION POLYMER SECONDARY CELL

(75) Inventors: Toshihiro Zushi, Itami (JP); Seiji Okada, Itami (JP); Itaru Gosho, Itami (JP); Shogo Tanno, Itami (JP); Mitsuhiro Marumoto, Itami (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 583 days.

(21) Appl. No.: 10/465,932

(22) PCT Filed: Dec. 21, 2001

(86) PCT No.: PCT/JP01/11230
§ 371 (c)(1),
(2), (4) Date: Aug. 11, 2003

(87) PCT Pub. No.: WO02/052670
PCT Pub. Date: Jul. 4, 2002

(65) Prior Publication Data
US 2004/0131945 A1 Jul. 8, 2004

(30) Foreign Application Priority Data
Dec. 26, 2000 (JP) .............................. 2000-395543
Dec. 19, 2001 (JP) .............................. 2001-386624

(51) Int. Cl.
*H01M 10/40* (2006.01)
(52) U.S. Cl. .................... 429/316; 429/94; 429/331; 429/332
(58) Field of Classification Search ................ 429/94, 429/316, 331, 332
See application file for complete search history.

(56) References Cited

U.S. PATENT DOCUMENTS

| | | | | | |
|---|---|---|---|---|---|
| 5,834,112 | A | * | 11/1998 | Muraoka et al. | 428/332 |
| 6,426,165 | B1 | * | 7/2002 | Coustier et al. | 429/316 |
| 2005/0208385 | A1 | * | 9/2005 | Nirasawa et al. | 429/94 X |

FOREIGN PATENT DOCUMENTS

| EP | 0 994 521 A1 | 4/2000 |
|---|---|---|
| JP | 08-050917 | 2/1996 |
| JP | 10-144350 | 5/1998 |

(Continued)

OTHER PUBLICATIONS

Computer-generated translation of JP 8-050,917 (Kawakami et al.) doc date Feb. 1996.*

(Continued)

*Primary Examiner*—Stephen J. Kalafut
(74) *Attorney, Agent, or Firm*—Leydig, Voit & Mayer, Ltd.

(57) ABSTRACT

A porous element containing a fluoropolymer comprising vinylidene fluoride as a main unit and having a density of 0.55–1.30 g/cm$^3$ and a Gurley value of not more than 150 sec/100 cc is used as a polymer substrate of a solid electrolyte to be placed between a positive electrode and a negative electrode. As a result, the solid electrolyte layer shows fine ion conductivity and an ion polymer secondary battery having strikingly improved low temperature characteristics, cycle characteristics and high-rate discharge characteristics as compared to conventional batteries can be obtained.

24 Claims, 3 Drawing Sheets

FOREIGN PATENT DOCUMENTS

| | | |
|---|---|---|
| JP | 11-297308 | 10/1999 |
| JP | 2000-340209 | 12/2000 |

OTHER PUBLICATIONS

Computer-generated translation of JP 10-144,350 (Katsumata et al.) doc date May 1998.*

Computer-generated translation of JP 11-297,308 (Kimijima) doc date Oct. 1999.*

Computer-generated translation of JP 2000-340,209 (Maruyama et al.) doc date Dec. 2000.*

* cited by examiner

LITHIUM ION POLYMER SECONDARY CELL

TECHNICAL FIELD

The present invention relates to a lithium ion polymer secondary battery.

BACKGROUND ART

Lithium ion secondary battery is generally formed by disposing an electrolyte between a positive electrode and a negative electrode. The positive electrode and negative electrode are respectively composed by forming a layer containing an active material, a conductive material, a binder and the like on the surface of a collector. As the active material for the positive electrode, Li—Mn type composite oxide, Li—Ni type composite oxide, Li—Co type composite oxide and the like are used and as the active material for the negative electrode, carbon materials are used.

Since lithium ion secondary batteries are capable of achieving high energy density and high voltage as compared to Nickel-Cadmium batteries and the like, they have been rapidly employed in recent years as an operate source of portable equipment, such as portable telephones and notebook personal computers. An expansion in the applicable range is expected in the future. In view of this, there have been actively studied lithium ion secondary batteries aiming for improved battery performance.

For example, what is called lithium ion polymer secondary batteries, wherein a solid electrolyte layer is disposed between a positive electrode and a negative electrode, have been drawing attention and being studied recently. The solid electrolyte layer is prepared such that a polymer substrate is impregnated with an electrolytic solution (lithium salt (electrolyte)+compatible solvent) which gels to show ion conductivity by itself. When a solid electrolyte layer is used, an electrolytic solution does not exist in a liquid state (the state where it flows by itself) within a battery, which in turn affords a huge advantage of absence of a leak from the battery. However, the battery characteristics (particularly, low temperature characteristics, cycle characteristics, high-rate discharge characteristics) of lithium ion secondary batteries using such a solid electrolyte layer tend to show inferior characteristics as compared to those of liquid type lithium ion secondary batteries (electrolytic solution+separator such as polyolefin), and the improvement thereof is a major goal.

In view of the above-mentioned situation, it is an object of the present invention to provide a lithium ion polymer secondary battery highly improved in all the low temperature characteristic, cycle characteristic and high-rate discharge characteristic.

DISCLOSURE OF THE INVENTION

The present inventors have conducted intensive studies with the aim of achieving the above-mentioned object, and as a result, have found that, by using a porous element of a fluoropolymer containing vinylidene fluoride as a main unit as a solid electrolyte polymer substrate, the battery characteristics can be improved and that the battery characteristics (particularly, low temperature characteristics, cycle characteristics and high-rate discharge characteristics) can be markedly improved by the use of one having a particular density and Gurley value, because the density and Gurley value of the porous element greatly affect the battery characteristics, which resulted in the completion of the present invention.

Accordingly, the lithium ion polymer secondary battery of the present invention is characterized by the following.

(1) A lithium ion polymer secondary battery comprising a positive electrode, a negative electrode and a solid electrolyte layer comprising a porous element comprising a fluoropolymer comprising vinylidene fluoride as a main unit and having a density of 0.55–1.30 g/cm$^3$ and a Gurley value of not more than 150 sec/100 cc, a salt and a compatible solvent, which is disposed between the positive electrode and the negative electrode.

(2) The lithium ion polymer secondary battery of the above-mentioned (1), wherein the salt is at least one kind of compound selected from $LiClO_4$, $LiBF_4$, $LiPF_6$, $LiAsF_6$, $LiCF_3SO_3$, $LiAlCl_4$ and $Li(CF_3SO_2)_2N$, and the above-mentioned compatible solvent is a mixed solvent of one or more kinds selected from ethylene carbonate, propylene carbonate, dimethyl carbonate, diethyl carbonate, ethylmethyl carbonate, dimethyl sulfoxide, sulfolane, γ-butyrolactone, 1,2-dimethoxyethane, N,N-dimethylformamide, tetrahydrofuran, 1,3-dioxolane, 2-methyltetrahydrofuran and diethyl ether.

(3) The lithium ion polymer secondary battery of the above-mentioned (1) or (2), wherein the positive electrode active material is a Li-transition metal composite oxide.

(4) The lithium ion polymer secondary battery of any of the above-mentioned (1) to (3), wherein the negative electrode active material is a graphite.

(5) The lithium ion polymer secondary battery of any of the above-mentioned (1) to (4), wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between said electrodes are spirally wound to constitute a roll, wherein the total thickness A of the positive electrode active material layers formed on both surfaces of the belt-shaped collector of the above-mentioned belt-shaped positive electrode and the total thickness B of the negative electrode active material layers formed on both surfaces of the belt-shaped collector of the above-mentioned belt-shaped negative electrode are each 80 μm-250 μm, and the ratio (A/B) of the total thickness A to the total thickness B is 0.4–2.2.

(6) The lithium ion polymer secondary battery of any of the above-mentioned (1) to (4), wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of the above-mentioned belt-shaped negative electrode is disposed on a still outer periphery of the outermost roll part of the above-mentioned belt-shaped positive electrode, and a first extrusion part extruding from a free end of the outermost roll part of the above-mentioned belt-shaped positive electrode is formed on a free end of the outermost roll part of the above-mentioned belt-shaped negative electrode, an innermost roll part of the above-mentioned belt-shaped negative electrode is disposed on a still inner periphery of the innermost roll part of the above-mentioned belt-shaped positive electrode and a second extrusion part extruding from a free end of the innermost roll part of the above-mentioned belt-shaped positive electrode is formed on a free end of the innermost roll part of the above-mentioned belt-shaped negative electrode, and a third and a fourth extrusion parts extruding from both ends in the width direction of the above-mentioned belt-shaped positive electrode are respectively formed on both ends in the width direction of the above-mentioned belt-shaped negative electrode.

BRIEF DESCRIPTION OF THE DRAWINGS

In FIG. 1 and FIG. 2, 1 shows a belt-shaped positive electrode, 1a shows an outermost roll part of the belt-shaped positive electrode, 1b shows an innermost roll part of the belt-shaped positive electrode, 2 shows a belt-shaped negative electrode, 2a shows an outermost roll part of the belt-shaped negative electrode, 2b shows an innermost roll part of the belt-shaped negative electrode, 2A shows a first extrusion part, 2B shows a second extrusion part, 2C-1 shows a third extrusion part, 2C-2 shows a fourth extrusion part, 3 shows a solid electrolyte layer, and 100 shows a roll. In FIG. 3, 11 shows a rectangular negative electrode plate, 12 shows a belt-shaped member of the solid electrolyte layer, and 13 is a rectangular positive electrode plate.

DETAILED DESCRIPTION OF THE INVENTION

Figure 1:
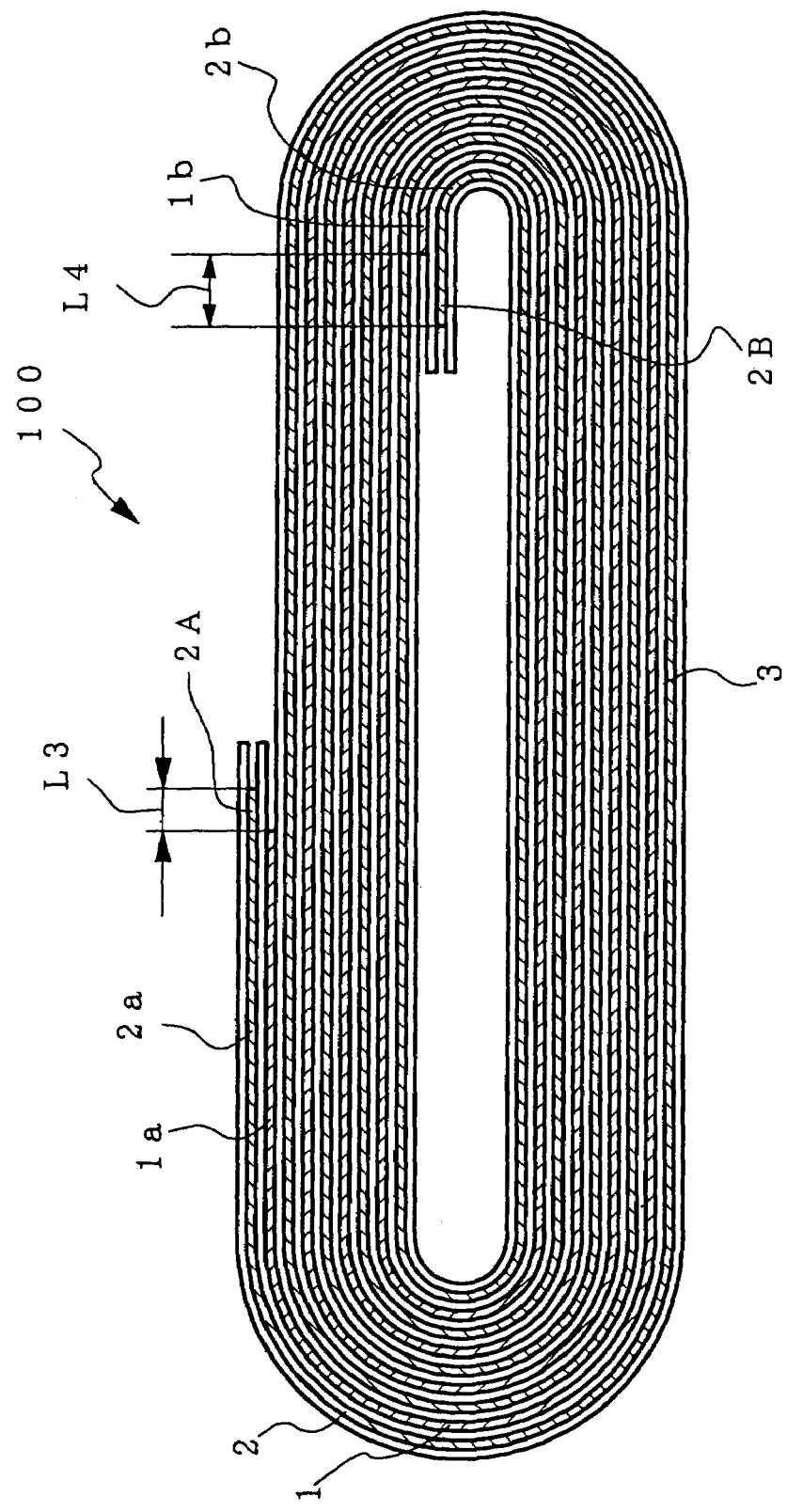
FIG. 1 shows a cross sectional view of one embodiment of the power generation element (roll) of the lithium ion polymer secondary battery of the present invention, comprising a positive electrode, a negative electrode and a solid electrolyte layer.

The lithium ion polymer secondary battery of the present invention is characterized in that a porous solid electrolyte layer comprising a porous element comprising a fluoropolymer comprising vinylidene fluoride as a main unit and having a density of 0.55–1.30 g/cm$^3$ and a Gurley value of not more than 150 sec/100 cc is disposed, as a polymer substrate, between a positive electrode and a negative electrode. Such constitution realizes fine low temperature characteristics, cycle characteristics and high-rate discharge characteristics.

As used herein, the density of a porous element comprising a fluoropolymer comprising vinylidene fluoride as a main unit means an "apparent density".

In the present invention, by the "fluoropolymer comprising vinylidene fluoride as a main unit" is meant a homopolymer of vinylidene fluoride (polyvinylidene fluoride (PVdF)), copolymers of vinylidene fluoride and other vinyl monomer having fluorine atom, wherein the proportion of the vinylidene fluoride (unit) is at least 70 mol %, and these polymers further grafted with vinyl polymers containing the below-mentioned functional groups. These may be used alone or two or more thereof may be used in combination. The above-mentioned other vinyl monomer having fluorine atom, which is other than vinylidene fluoride, is exemplified by hexafluoropropylene (HFP), chlorotrifluoroethylene (CTFE), tetrafluoroethylene (TFE) and the like. The form of the above-mentioned copolymer may be random or block. The proportion of vinylidene fluoride (unit) in the above-mentioned copolymer is preferably not less than 75 mol %.

The functional group-containing vinyl polymer that grafts the above-mentioned homopolymer of vinylidene fluoride or the copolymer of vinylidene fluoride and other vinyl monomer having fluorine atom is exemplified by polymers of, vinyl monomer having a functional group such as carboxyl group (—COOH), sulfo group (—SO$_2$OH), carboxylic acid ester group (—COOR), amide group (—CONH$_2$), phosphoric acid group (—PO(OH)$_2$) and the like. As used herein, the substituent R of the carboxylic acid ester group (—COOR) is a lower alkyl group having 1 to 4 carbon atoms, such as methyl group, ethyl group, butyl group and the like. In the case of the form of polymer wherein such functional group-containing vinyl polymer is grafted, the adhesive property of the solid electrolyte layer to the positive electrode or negative electrode is improved, preferably further reducing the resistance between electrodes. The vinyl monomer having the above-mentioned functional group is preferably a vinyl compound (monomer) wherein the moiety other than the functional group has not more than 4 carbon atoms. As the carboxyl group-containing monomer, those having one carboxyl group such as acrylic acid, methacrylic acid, crotonic acid, vinyl acetate, allyl acetate and the like, as well as those having two carboxyl groups such as itaconic acid, maleic acid and the like can be used. As the sulfo group-containing monomer, styrene sulfonate, vinyl sulfonate and the like are preferable. As the carboxylic acid ester group-containing monomer, methyl acrylate, butyl acrylate and the like are preferable. As the amid group-containing monomer, acrylamide and the like are preferable. As the phosphoric acid group-containing monomer, triphenyl phosphate, tricresyl phosphate and the like are preferable. Of these, most preferred are acrylic acid and methacrylic acid.

The method of grafting is preferably a radiation method. For example, polymer chain substrate (polymer to be grafted) and a graft monomer material are co-existed and radiation is continuously or intermittently applied. More preferably, the polymer substrate is irradiated in advance before co-using the both. For radiation, electron beam, X-rays or γ-rays are used. By the irradiation, the polymer substrate generates a free group and is activated.

The degree of grafting can be determined according to some factors. The most important factors are the length of time of contact of activated substrate with a graft monomer, the degree of preliminary activation of substrate by irradiation, the degree to allow monomer material to permeate the substrate, and the temperature during contact between the substrate and the monomer. For example, when the graft monomer is an acid, a solution containing the monomer is sampled, titrated against base, and remaining monomer concentration is measured, whereby the degree of grafting can be monitored. The degree of grafting is preferably 2–20%, particularly preferably 3–12%, specifically preferably 5–10%, of the final weight.

The grafting may be conducted by a method comprising activation (occurrence of free group) by exposure of the polymer substrate to light or heat.

In the present invention, a porous element comprising a fluoropolymer comprising vinylidene fluoride as a main unit and having a particular density (0.55–1.30 g/cm$^3$) and a particular Gurley value (not higher than 150 sec/100 cc) is used as a polymer substrate of the solid electrolyte layer, which greatly improves the battery characteristics. This is considered to be attributable to the fact that a polymer substrate is present in a solid electrolyte at a suitable proportion, and the continuous bubble (pore) structure of the polymer substrate is noticeable, which in turn results in preferable gel state of a solid electrolyte layer due to ion conduction.

When the porous element comprising a fluoropolymer comprising vinylidene fluoride as a main unit has a density of less than 0.55 g/cm$^3$, ion conductivity becomes lower because a solid electrolyte layer using such porous element has a greater portion of liquid phase involving no (less) polymer chain in the layer. As a result, the battery characteristics (particularly low temperature characteristics) are degraded, causing a short circuit, to possibly make charge and discharge unattainable. In addition, due to degraded mechanical strength of the porous element, handling of the element during the assembly of the battery may become difficult. In contrast, when the porous element has a density exceeding 1.30 g/cm$^3$, the improving effect of battery characteristics (low temperature characteristics, cycle characteristics and high-rate discharge characteristics) may be difficult to achieve.

In the present invention, the porous element comprising a fluoropolymer comprising vinylidene fluoride as a main unit preferably has a density of 0.60–1.20 g/cm$^3$, more preferably 0.65–0.85 g/cm$^3$.

In addition, when a porous element comprising a fluoropolymer comprising vinylidene fluoride as a main unit and having a Gurley value exceeding 150 sec/100 cc, a solid electrolyte layer using such a porous element does not show fine ion conductivity, and battery characteristics (particularly low temperature characteristics) are degraded even if the porous element has a density within the range of 0.55–1.30 g/cm$^3$. In the present invention, the porous element comprising a fluoropolymer comprising vinylidene fluoride as a main unit has a Gurley value of preferably not more than 100 sec/100 cc, more preferably not more than 50 sec/100 cc. While the lower limit of the Gurley value is not particularly limited, it is preferably not less than 2 sec/100 cc, more preferably not less than 5 sec/100 cc.

In the present invention, the average pore size of the porous element comprising a fluoropolymer comprising vinylidene fluoride as a main unit is preferably 0.01–10 μm, particularly preferably 0.1–5 μm. This "average pore size" is an average value of pore sizes of optional 10 pores as measured by observation with SEM. While it varies depending on the density and Gurley value of the porous element, when the average pore size of the pores is less than 0.01 μm, liquid retention capability becomes low, whereas when it exceeds 10 μm, the porous element has a lower mechanical strength, which in turn sometimes show lower handling property during the production of batteries.

In the present invention, the fluoropolymer comprising vinylidene fluoride as a main unit preferably shows a melt flow index at 230° C., 10 kg of not more than 1.0 g/10 min, more preferably 0.2–0.7 g/10 min. When the melt flow index is not more than 1.0 g/10 min, mechanical strength and ion conductivity of solid electrolyte layer at room temperature are further improved. The melt flow index here is measured according to the method defined in standard ASTM D 1238.

In the present invention, the solid electrolyte layer is formed by impregnating a porous element comprising the above-mentioned fluoropolymer comprising vinylidene fluoride as a main unit with an electrolytic solution comprising a salt (lithium salt) and a compatible solvent. As used herein, by the "compatible solvent" is meant a solvent that dissolves a salt (lithium salt), and dissolves or swells the above-mentioned fluoropolymer comprising vinylidene fluoride as a main unit.

The salt (lithium salt) is exemplified by one or more kinds selected from the group consisting of $LiClO_4$, $LiBF_4$, $LiPF_6$, $LiAsF_6$, $LiCF_3SO_3$, $LiAlCl_4$ and $Li(CF_3SO_2)_2N$. Of these, $LiPF_6$ is preferable.

As the compatible solvent, for example, ethylene carbonate, propylene carbonate, dimethyl carbonate, diethyl carbonate, ethylmethyl carbonate, dimethyl sulfoxide, sulfolane, γ-butyrolactone, 1,2-dimethoxyethane, N,N-dimethylformamide, tetrahydrofuran, 1,3-dioxolane, 2-methyltetrahydrofuran, diethyl ether and the like can be used. These may be used alone or in a mixed solvent comprising two or more kinds thereof. A mixed solvent of 4 kinds of ethylene carbonate, propylene carbonate, ethylmethyl carbonate and diethyl carbonate is preferable. In the mixed solvent, ethylene carbonate is preferably contained in 5–30 vol %, more preferably 15–25 vol %; propylene carbonate is preferably contained in 5–25 vol %, more preferably 8–20 vol %; ethylmethyl carbonate is preferably contained in 40–75 vol %, more preferably 55–65 vol %; and diethyl carbonate is preferably contained in 5–20 vol %, more preferably 8–15 vol %.

The salt concentration of the electrolytic solution (salt+compatible solvent) is preferably 0.5–1.5 mol/L, more preferably 0.7–1.3 mol/L, particularly preferably 0.8–1.2 mol/L. When the concentration is less than 0.5 mol/L, ion conductivity is degraded, possibly resulting in insufficient battery capacity or degraded high-rate discharge characteristics, whereas when it exceeds 1.5 mol/L, high-rate discharge characteristics and low temperature characteristics unpreferably tend to be degraded due to higher viscosity.

It is possible to use plasticizers such as tetraethylene glycol dimethyl ether, N-methyl-pyrrolidone(1-methyl-2-pyrrolidone), ethylene glycol dimethyl ether, diethylene glycol dimethyl ether and the like, together with the above-mentioned compatible solvent. The use of said plasticizer preferably prevents crystallization of electrolytic solution (salt+compatible solvent) during use of the battery at low temperature (particularly not higher than −10° C.). The amount of the plasticizer to be used is preferably about 1–50 wt % of the compatible solvent.

In the present invention, the thickness of the solid electrolyte layer varies depending on the shape, size and the like of the positive electrode and negative electrode. In general, the average thickness is preferably 5–100 μm, particularly preferably 8–50 μm, specifically preferably 10–30 μm. As used herein, the thickness of the solid electrolyte layer refers to the thickness when it is disposed between the positive electrode and the negative electrode (when battery is actually assembled) and equals to the distance between the positive electrode and the negative electrode.

The method for preparing the solid electrolyte layer in the present invention is not particularly limited, and may be, for example, the methods of the following (a)–(c) and the like.

(a) A method wherein a fluoropolymer comprising vinylidene fluoride as a main unit is formed into a film by a known foam-molding method by extrusion-foaming-molding and the like to give a porous film, or a coating liquid (paste) containing a fluoropolymer, a suitable solvent and a foaming agent in admixture is prepared, the coating liquid (paste) is applied to the surface of a release substrate with a suitable coater to form a coating film, the coating film is heated, dried and released from the release substrate to give a porous film, and the obtained porous film is immersed in a solution obtained by dissolving a salt in a compatible solvent to allow gellation (including immersion in a solution together with a positive electrode and a negative electrode during process for producing a battery).

(b) A method wherein a salt, a compatible solvent and a foaming agent are dissolved in a suitable solvent, a fluoropolymer is added and dissolved by heating as necessary to give a coating liquid (paste), which is applied to a surface of a release substrate with a suitable coater to form a coating film, the coating film is heated while raising the temperature serially and dried to evaporate the aforementioned solvent and to simultaneously produce bubbles and the solid electrolyte layer is released from a release substrate. For the above-mentioned heating and drying, a release substrate having a coating film formed thereon may be passed through heating chambers having different temperatures.

(c) a coating film is directly formed with the above-mentioned coating liquid (paste) containing a salt, a compatible solvent, a foaming agent and a fluoropolymer dissolved therein on at least one surface of a positive electrode and/or a negative electrode formed in a belt shape, a plate shape and the like, and a solid electrolyte layer is formed by evaporation of solvent and generation of bubbles.

As the foaming agent to be used for the above-mentioned methods (a)–(c), decomposition foaming agent, gas foaming agent and volatile foaming agent can be used. For the above-mentioned method (a), a gas foaming agent or a volatile foaming agent is preferably used. As the gas foaming agent, nitrogen, carbon dioxide, propane, neopentane, methylether, dichlorodifluoromethane, n-butane, iso-butane and the like are preferable and as the volatility foaming agent, n-octanol, 1-pentanol, 3-methyl-1-butanol, 2-methyl-1-butanol, 2-pentanol, 3-pentanol, 2-methyl-2-butanol, 3-methyl-2-butanol and the like are preferable. For the above-mentioned methods (b) and (c), a volatility foaming agent is preferable, and n-octanol, 1-pentanol, 3-methyl-1-butanol and the like are particularly preferable, specifically n-octanol is preferable. As the solvent for the above-mentioned methods (a)–(c), for example, tetrahydrofuran (THF), dimethylacetamide, dimethylformamide (DMF) and the like are used.

The density of the porous element is controlled by changing the amount of foaming agents and various conditions of the production. For example, in the case of method (a), the production conditions that markedly affect the density (expansion degree) besides the amount of the foaming agent are molding temperature, molding rate, molding pressure and the like. In the case of methods (b) and (c), the production conditions that markedly affect the density (expansion degree) besides the amount of the foaming agent are coating rate, drying temperature profile, degree of exhaustion, molding rate and the like.

In addition, the Gurley value of the porous element is controlled by, for example, concentration of solvent and foaming agent in a coating liquid wherein a foaming agent, a fluoropolymer and the like are dissolved, exhaust conditions and application rate during application of coating liquid, temperature distribution in the drying furnace during drying of coating film, and the like.

Of the above-mentioned methods (a)–(c), method (a) is preferable in view of easy control of density and Gurley value.

The active material for the positive electrode of the lithium ion polymer secondary battery of the present invention is preferably Li-transition metal composite oxide, and the Li-transition metal composite oxide shown by the following formula (I) or (II) is particularly preferable.

$$Li_A M_{1-X} Me_X O_2 \qquad (I)$$

wherein M is a transition metal such as Co, Ni, Mn, V, Ge and the like, and $$Li_A M_{2-X} Me_X O_4 \qquad (II)$$

wherein M is a transition metal such as Mn, Fe, Ni and the like. In the formulas (I) and (II), Me is a 3–10 group element in the periodic table, such as Zr, V, Cr, Mo, Fe, Co, Mn, Ni and the like, or a 13–15 group element, such as B, Al, Ge, Pb, Sn, Sb and the like, provided that Me and M are different elements and Me may consist of two or more kinds of elements.

A in the formula (I) is 0.05–1.5, preferably 0.1–1.1, and in the formula (II), it is 0.05–2.5, preferably 0.5–1.5. X in the formula (I) and (II) is 0 or 0.01–0.5, preferably 0.02–0.2. When Me consists of two or more kinds of elements, X is the total number of the two or more kinds of elements.

Specific examples of the Li-transition metal composite oxide of the formulas (I) and (II) include $LiCoO_2$, $LiNiO_2$, $LiMnO_2$, $LiMn_{(1-X)} Al_X O_2$, $LiMn_{(1-X)} Co_X O_2$, $LiMn_{(1-X-Y)} Al_X Co_Y O_2$, $LiMn_2 O_4$, $LiMn_{2-X} Co_X O_4$, $LiMn_{(2-X-Y)} Co_X Ge_Y O_4$, $LiCo_{(1-X)} Ni_X O_2$, $LiNi_{(1-X)} Al_X O_2$, $LiCo_{(1-X)} Mn_X O_2$ and the like, wherein $0.1 \geq X$ and $Y \leq 0.1$, with preference given to $LiCoO_2$ and $LiNiO_2$, particularly preferably $LiCoO_2$.

The Li-transition metal composite oxide represented by the formula (I) or the formula (II) is preferable particles satisfying the following formula (III).

$$7 \leq [20/(\text{specific surface area } [m^2/g] \times \text{average particle size } [\mu m])] \leq 9 \qquad (III)$$

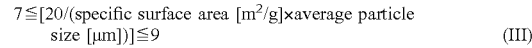

Of those satisfying the formula (III), one having an average particle size of not less than 10 μm, preferably not less than 17 μm, is more preferable in view of the safety of batteries. When the average particle size exceeds 25 μm, the resistant component of the active material markedly increases. Thus, the average particle size is preferably not more than 25 μm, more preferably not more than 23 μm.

The average particle size of the above-mentioned Li-transition metal composite oxide is measured by the following method.

First, the particles to be the measurement target are cast in an organic liquid such as water, ethanol and the like, and dispersed by ultrasonication at about 35 kHz–40 kHz for about 2 minutes. The particles are in such an amount that makes the laser transmittance (quantity of outgoing light/quantity of incident light) of the dispersion after dispersing treatment 70%–95%. Then, the dispersion is subjected to a microtrack particle size analyzer and the particle size (D1, D2, D3 . . . ) of each particle, and the number (N1, N2, N3 . . . ) of particles having each particle size are measured based on the diffusion of a laser beam.

The microtrack particle size analyzer calculates the particle size distribution of a spherical particle group having a theoretical strength closest to the observed diffusion strength distribution. That is, particles are assumed to have a circular section of the same area as the projected image obtained by the irradiation of a laser beam, and the diameter of the sectional circle is taken as the particle size.

The average particle size (μm) is calculated from the following formula (IV) using the particle size (D) of each particle and the number (N) of particles having each particle size, which are obtained above.

$$\text{average particle size } (\mu m) = (\Sigma ND^3 / \Sigma N)^{1/3} \quad (IV)$$

The above-mentioned Li-transition metal composite oxide has a specific surface area measured by the gas phase adsorption method (single-point method) wherein nitrogen is an adsorbate, from among the adsorption methods described in *Material Chemistry of Fine Particles*, Yasuo Arai, first edition, 9th impression, Baifukan (Tokyo), pp. 178–184 (1995).

For example, the Li-transition metal composite oxide represented by the formula (I) or (II) can be produced by the following methods.

One method therefor comprises mixing a starting lithium compound and a desired transition metal compound to make the atomic ratio of the transition metal to lithium 1:1–0.8:1, heating the mixture at a temperature of from 700° C. to 1200° C. in the atmosphere for 3 hours–50 hours to allow reaction, pulverizing the reaction product into particles and harvesting those having the objective particle size.

A different method further includes heating the above-harvested particles. The heat treatment of the particles includes heating at about 400° C.–750° C., preferably about 450° C.–700° C., for about 0.5 hr.–50 hrs., preferably about 1 hr.–20 hrs. When the particles are heat treated, only the specific surface area can be reduced without changing the average size of the particles. As a result, a Li-transition metal composite oxide that satisfies the particular relationship (relationship of formula (III)) between the above-mentioned particle size and specific surface area can be easily obtained.

The atmosphere of the heat treatment of the pulverized particles is not limited, and may be the air or an inert gas (e.g., nitrogen, argon) atmosphere. When carbonic acid gas is present in the atmosphere, however, lithium carbonate is generated and the content of the impurity may increase. Thus, the heat treatment is preferably conducted in an atmosphere having a carbonic acid gas partial pressure of not more than about 10 mmHg.

The lithium compound to be a starting material is exemplified by lithium oxide, lithium hydroxide, lithium halide, lithium nitrate, lithium oxalate, lithium carbonate and mixtures thereof. Examples of the transition metal compound include oxide of transition metal, hydroxide of transition metal, halide of transition metal, nitrate of transition metal, oxalate of transition metal, carbonate of transition metal, and mixtures thereof. When the desired composite oxide contains the substituted element of (Me), a necessary amount of a compound of the substituted element of (Me) is added to a mixture of a lithium compound and a transition metal compound.

In the lithium ion secondary battery of the present invention, the positive electrode generally consists of a composition layer (hereinafter to be referred to as a positive electrode active material layer) containing at least an active material, a conductive material and a binder. The positive electrode is generally formed into a rectangular plate, a belt-shaped member and the like, which is used in 1 (sheet), or plural (sheets), per one battery according to the objective battery capacity. In the case of 1 (sheet), or plural (sheets of) positive electrodes, a positive electrode active material layer may be formed on one or both surface(s) of a collector.

As the conductive material, particulate carbon materials, conventionally used for conductive material for positive electrode of lithium ion secondary battery are used. Here, the "particulate" includes scaly, spherical, pseudospherical, bulky, whisker and the like, wherein 2 or more kinds of particles having a different shapes may be present. The particulate carbon material is exemplified by carbon blacks such as artificial or natural graphites (graphite carbon), KETJENBLACK, acetylene black, oil furnace black, extra-conductive furnace black and the like. These may be used alone or two or more thereof may be used in combination.

Preferable embodiments of the conductive material include graphites having an average particle size of 3–8 μm (preferably 4–7 μm), and carbon blacks having an average particle size of not more than 0.1 μm (preferably not more than 0.01 μm) at a weight ratio (graphites:carbon blacks) of 1:0.01–1:1, preferably 1:0.1–1:0.5. While the lower limit of the average particle size of carbon blacks is not particularly limited, it is preferable not less than 0.005 μm. In this embodiment, the clearance between the active material (particles) and the active material (particles) is mainly embedded by graphites having a greater particle size, and carbon blacks having a smaller particle size mainly cover the surface of the active material, thereby ensuring the high conductivity of the positive electrode, and improving the low temperature characteristics, cycle characteristics and high-rate discharge characteristics of the battery. In this embodiment, the graphite is preferably graphitized carbon showing a spacing of lattice planes (d002) of not more than 0.34 nm and crystallite size in the c-axis direction (Lc) of not less than 10 nm, and carbon black is preferably oil furnace black.

The particle size of the conductive material (particulate carbon material) is meant a diameter of section assuming particles to be spheres (diameter corresponding to sphere), and can be measured in the same manner as in the aforementioned Li-transition metal composite oxide particles using a microtrack particle size analyzer. The spacing of lattice planes (d002) and crystallite size in the c-axis direction (Lc) of the above-mentioned graphites can be measured according to Japan Society for the Promotion of Science Method. The method is explained in detail in the following.

First, highly pure silicon for X-ray standard is pulverized to not more than 325 mesh standard sieve in an agate mortar to give a standard substance. The standard substance and graphitized carbon, which is a specimen to be measured, are mixed in an agate mortar (standard substance 10 wt % relative to graphitized carbon 100 wt %) to give a specimen for X-ray. This specimen for X-ray is uniformly filled in a sample board for an X-ray diffraction apparatus RINT2000 (RIGAKU ELECTRIC CORPORATION, ray source: CuKα ray). Then, setting the voltage applied on an X-ray tube for 40 kV, the current to be applied for 50 mA, scanning range to 2θ=23.5 degree –29.5 degree, and scanning speed for 0.25 degree/min, the 002 peak of carbon and 111 peak of the standard substance are measured. Then, using the graphitized degree calculation soft attached to the above-mentioned X-ray diffraction apparatus, the spacing of lattice planes (d002) and crystallite size in the c-axis direction (Lc) are calculated from the obtained peak position and the half-width.

The amount of the conductive material to be used is generally about 3–15 parts by weight, preferably 3–10 parts by weight, relative to 100 parts by weight of the active material.

As the binder, polyvinylidene fluoride, polytetrafluoroethylene, polyethylene, ethylene-propylene-diene type polymer and the like are preferably used. The amount of the binder to be used is preferably 1–20 parts by weight, more preferably 2–10 parts by weight, per 100 parts by weight of the active material.

As the collector on which to form a positive electrode active material layer, for example, those similar to conventional ones such as foil, expanded metal and the like formed from aluminum, aluminum alloy, titanium and the like can be used.

The positive electrode active material layer can be generally formed by (1) a kneading step, (2) a coating step, (3) a drying step and (4) a roll-spreading step.

In the kneading step (1), the aforementioned active material, conductive material, binder and the like are kneaded in conventionally known N-methylpyrrolidone using, for example, a conventionally known kneading apparatus such as planetary dispa kneading apparatus (ASADA IRON WORKS CORPORATION) and the like in the manner generally employed in this field to achieve uniform dispersion to give a slurry.

In the subsequent coating step (2), the above-mentioned obtained slurry is applied on a collector as generally done in this field using a conventionally known application apparatus such as a commarole type or diecoat type application apparatus and the like.

In the drying step (3), the slurry applied to the collector is dried in a warm air drying oven and the like in, for example, a temperature range of 100–200° C. for 5–20 min.

In the subsequent roll-spreading step (4), using an apparatus such as rolling press apparatus and the like, the above-mentioned slurry dried on a collector is roll-spread in layers to form a positive electrode active material layer. The roll-spreading conditions of this roll-spreading step, i.e., roll-spreading temperature and roll-spreading rate, are set for particular ranges to control porosity of the formed positive electrode active material layer.

The roll-spreading temperature in the rolling step is preferably 20–100° C., more preferably 25–50° C., and the roll-spreading rate is preferably 10–40%, more preferably 20–35%. When both the roll-spreading temperature and roll-spreading rate are less than the above-mentioned ranges, spring back occurs due to the roll-spreading at a low temperature and the safety of the obtained lithium ion secondary battery decreases. In addition, due to low roll-spreading rate, inconveniences may arise, such as a failure to achieve the design capacity, lower adhesion between the positive electrode active material layer and the collector. When both the roll-spreading temperature and roll-spreading rate exceed the above-mentioned ranges, due to a high temperature roll-spreading and the high-rate discharge characteristics tend to be degraded. When the roll-spreading rate is within the above-mentioned range and the roll-spreading temperature is less than the above-mentioned range, the design capacity may be achieved but due to the spring back, the safety of the obtained lithium ion secondary battery may be degraded. When the roll-spreading rate is within the above-mentioned range and the roll-spreading temperature exceeds the above-mentioned range, the design capacity may be achieved but due to insufficient immersion of an electrolytic solution, the resistance of the electrode may become higher. Furthermore, when the roll-spreading temperature is within the above-mentioned range and the roll-spreading rate is less than the above-mentioned range, the roll-spreading cannot be applied sufficiently, which in turn may result in the degradation of the cycle characteristics due to lower adhesion between the positive electrode active material layer and the collector. When the roll-spreading temperature is within the above-mentioned range and the roll-spreading rate exceeds the above-mentioned range, the high-rate discharge characteristics may be degraded. As used herein, the roll-spreading temperature means the temperature during processing of the material used for roll-spreading processing and the roll-spreading rate means a parameter expressing the roll-spreading processing degree also called draught rate and the like. The roll-spreading rate is calculated according to the following formula (V), wherein h1 is the thickness before roll-spreading, h2 is the thickness after roll-spreading, and h3 is the thickness of the collector.

$$\text{roll-spreading rate } (\%) = (h1-h2) \times 100/(h1-h3) \quad \text{(V)}$$

The thickness of the positive electrode active material layer is preferably 80–300 μm, particularly preferably 80–250 μm, specifically preferably 120–160 μm. As used herein, the "thickness of the positive electrode active material layer" refers to the thickness of the positive electrode active material layer formed on one surface of a collector, when the positive electrode active material layer is formed on one surface thereof, and when the active material layers are formed on both surfaces of the collector, the total of the thickness of the two positive electrode active material layers formed on the both surfaces thereof. When the thickness of the positive electrode active material layer is less than 80 μm, the insufficient application amount causes lower charge and discharge capacity and possible unpreferable degradation of the high-rate discharge characteristics and low temperature characteristics due to excessive roll-spreading. When the thickness exceeds 300 μm, the adhesion between the active material layer and the collector decreases markedly to possibly result in degraded cycle characteristics. Particularly when the positive electrode and the negative electrode to be mentioned later are to be belt-shaped, and a roll is composed by spirally winding upon disposing a belt-shaped solid electrolyte between the belt-shaped positive electrode and the belt-shaped negative electrode, which roll is then housed in an exterior package (battery can etc.) to give a battery, the outer diameter of the roll exceeds the design value, which may inconveniently prevent easy insertion of the roll into the exterior package (battery can etc.).

In the lithium ion secondary battery of the present invention, a negative electrode generally is composed by forming a composition layer (hereinafter to be referred to as a negative electrode active material layer) containing at least a negative electrode active material and a binder on a collector. Like the positive electrode, the negative electrode is generally formed into a rectangular plate, a belt-shaped member and the like, which is used in 1 (sheet), or plural (sheets), per one battery according to the objective battery capacity. In the case of 1 (sheet), or plural (sheets of) negative electrodes, a negative electrode active material layer may be formed on one or both surface(s) of a collector.

The negative electrode active material is not particularly limited and carbon materials conventionally used as negative electrode active materials of lithium ion secondary batteries can be used. However, graphitized carbon is preferable, and those having a specific surface area of not more than 2.0 m²/g (preferably 0.5–1.5 m²/g) are preferable, and those having a specific surface area of not more than 2.0 m²/g (preferably 0.5–1.5 m²/g) and a spacing of lattice planes (d002) of not more than 0.3380 nm (preferably 0.3355–0.3370 nm) and a crystallite size in the c-axis direction (Lc) of not less than 30 nm (preferably 40–70 nm) are particularly preferable. When a graphitized carbon having a spacing of lattice planes (d002) of more than 0.3380 nm or having a crystallite size in the c-axis direction (Lc) of less than 30 nm is used, the voltage of the negative electrode plate may be increased to unpreferably decrease average discharge potential of the battery.

The particles constituting the graphitized carbon are not particularly limited in shape, and they can be scaly, fibrous, spherical, pseudo-spherical, bulky, whisker and the like. However, the graphitized carbon is preferably fibrous.

When they are fibrous, those having an average fiber length of 1–100 μm, particularly preferably 2–50 μm, specifically preferably 3–25 μm, are preferable to improve coatability of an active material composition to a collector. The average fiber diameter is preferably 0.5 μm–15 μm, particularly preferably 1 μm–15 μm, specifically preferably 5 μm–10 μm. In this event, the aspect ratio (average fiber length/average fiber diameter ratio) is more preferably 1–5.

The fiber diameter and fiber length of the above-mentioned fibrous graphitized carbon are measured using an electron microscope. Specifically, the magnification is set to a value that contains at least 20 fibers in the view and an electron microscopic photograph is taken. The fiber diameter and fiber length of each fiber on the photograph are measured with a caliper. The fiber length is the shortest distance between one end to the other end of a fiber when it is linear. When the fiber is curled, the fiber length is the distance between two optional and most distant points on the fiber.

As the binder to be used along with the negative electrode active material, polytetrafluoroethylene, polyvinylidene fluoride, polyethylene, ethylene-propylene-diene type polymer and the like can be used as conventional.

The negative electrode active material layer may contain a conductive material as necessary. In this case, the conductive material is exemplified by carbon blacks having an average particle size of not more than 5 μm, and the like. As the collector to be used as the negative electrode, conventional ones can be used, such as foil and expanded metal made from copper, nickel, silver, stainless and the like.

The negative electrode active material layer is basically formed by a method (kneading step, painting step, drying step, roll-spreading step) similar to the methods for the aforementioned positive electrode active material layer, and the thickness thereof is preferably 50–300 μm, particularly preferably 80–250 μm, specifically preferably 100–200 μm. As used herein, by the "the thickness of the negative electrode active material layer" is meant the thickness of the negative electrode active material layer formed on one surface of a collector, when the negative electrode active material layer is formed on one surface thereof, and when the negative electrode active material layers are formed on both surfaces of the collector, the total of the thickness of the two negative electrode active material layers formed on the both surfaces thereof.

The lithium ion polymer secondary battery of the present invention is formed by disposing a solid electrolyte layer comprising a porous element comprising a fluoropolymer comprising vinylidene fluoride as a main unit, a salt and a compatible solvent between a positive electrode and a negative electrode and the form of the battery is not particularly limited. For example, the following forms (i), (ii) and (iii) are preferable.

(i) A form prepared by intervening a belt-shaped solid electrolyte layer between a belt-shaped positive electrode and a belt-shaped negative electrode and spirally winding them to give a roll, which is then housed in an exterior package. Here, the belt-shaped positive electrode and the belt-shaped negative electrode are made by forming active material layer on both surfaces of a collector.

(ii) A form prepared by providing a rectangular positive electrode plate, a rectangular negative electrode plate and a rectangular solid electrolyte layer having about the same size with them, forming a laminate comprising one or more repeats of a unit comprising a rectangular positive electrode plate, a rectangular negative electrode plate and a rectangular solid electrolyte layer sandwiched between the electrodes, and the laminate is housed in an exterior package. Here, a negative electrode plate forming an active material layer on one surface of a collector is disposed on the uppermost and the lowermost positions and other negative electrode plates and the positive electrode plates comprise active material layers on both surfaces of a collector.

Figure 3:
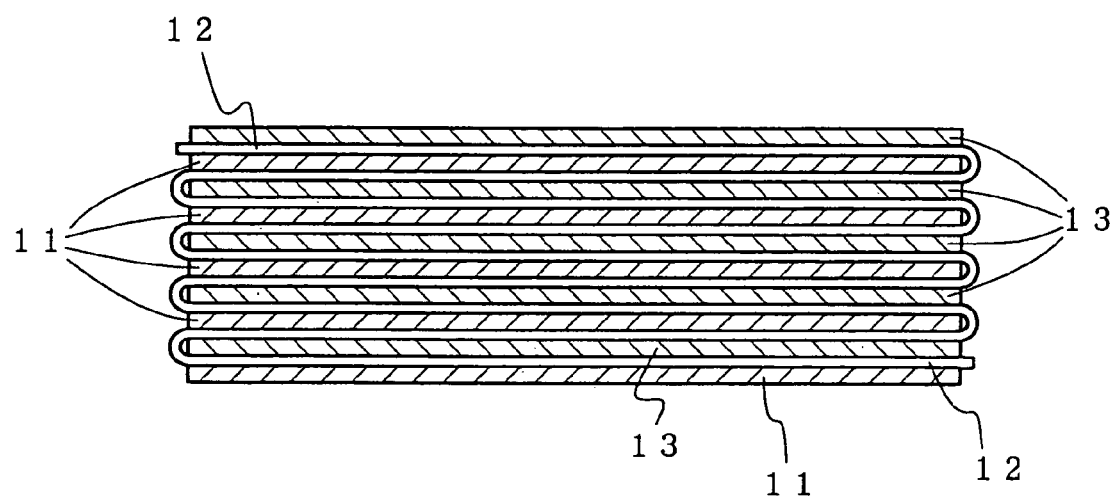
FIG. 3 shows a cross sectional view of another embodiment of the power generation element of the lithium ion polymer secondary battery of the present invention, comprising a positive electrode, a negative electrode and a solid electrolyte layer.

(iii) As shown in FIG. 3, a laminate structure is prepared wherein a belt-shaped solid electrolyte layer 12 is superimposed on a rectangular negative electrode plate 11, on which a rectangular positive electrode plate 13 is superimposed, the negative electrode plate 11 and a positive electrode plate 13 are alternately laminated via a solid electrolyte layer 12 while repeatedly folding the belt-shaped solid electrolyte layer 12, and a positive electrode plate 13 is disposed on the uppermost position, and the laminate structure is housed in an exterior package. Here, the lowermost and the uppermost negative electrode plates comprise an active material layer formed on one surface of a collector and other negative electrode plates and positive electrode plates have active material layers formed on both surfaces of a collector.

As the above-mentioned exterior package, metal cans such as a cylindrical tube can, a square tube can, a button-shaped can and the like, a sheet exterior package such as a laminate film and the like are used. As a laminate film, a film comprising a laminate layer of a thermoplastic resin such as polyester, polypropylene and the like is formed at least on one surface of a metal foil made of copper, aluminum and the like is preferable. A film having such thermoplastic resin laminate layer can be sealed by armoring the film on the above-mentioned roll or laminate structure (stuck) and heat-welding the periphery thereof, facilitating the assembly of batteries.

In the case of the form of the above-mentioned (i), for example, a roll having a complete round (about complete round) section is prepared and housed in a cylindrical tube can to give a cylindrical tube type battery. When a roll having a rectangular section is prepared and housed in a square tube can, a square tube type battery is obtained. When a roll having a flat section (elliptic etc.) is prepared and a battery is composed by armoring with an exterior package sheet of a laminate film and the like, what is called, a sheet battery is obtained, which is thinner than can type batteries. On the other hand, the forms of the above-mentioned (ii) and (iii) are generally applied to sheet batteries, in which case a laminate structure comprising a positive electrode plate, a negative electrode plate and a solid electrolyte layer is armored with an exterior package sheet made of a laminate film and the like.

When a sheet battery is to be composed using a roll having a flat section (i.e., the form of the above-mentioned (i)), a power generation element (i.e., a structure containing a positive electrode, a negative electrode and a solid electrolyte layer) can be easily prepared and winding enables laminating a belt-shaped positive electrode, a belt-shaped negative electrode and a solid electrolyte layer with superior adhesiveness. Thus, it is advantageous for producing thinner batteries. In contrast, when a sheet battery is to be composed using a laminate structure (i.e., the form of the above-mentioned (ii) or (iii)), the electrode does not include many useless parts and the battery can be advantageously made to have high capacity.

In the lithium ion secondary battery of the present invention, when the form of the battery is the above-mentioned (i), wherein a belt-shaped solid electrolyte layer is disposed between the belt-shaped positive electrode and the belt-shaped negative electrode and spirally wound to give a roll, which is housed in an exterior package, the roll is preferably has a constitution of the following (a) and/or (b).

(a) The total layer thickness A of positive electrode active material layers formed on both surfaces of a collector of a belt-shaped positive electrode in the roll is set to 80–250 μm, total layer thickness B of negative electrode active material layers formed on both surfaces of a collector of the belt-shaped negative electrode is set to 80–250 μm and the ratio (A/B) of the total layer thickness A to the total layer thickness B is set to 0.4–2.2. With this constitution, peeling off of an active material layer, occurrence of crack and the like of the positive electrode and negative electrode can be prevented during preparation of a roll, and the energy density of the battery can be markedly increased, thereby achieving preferable results of high-rate discharge characteristics.

Figure 2:
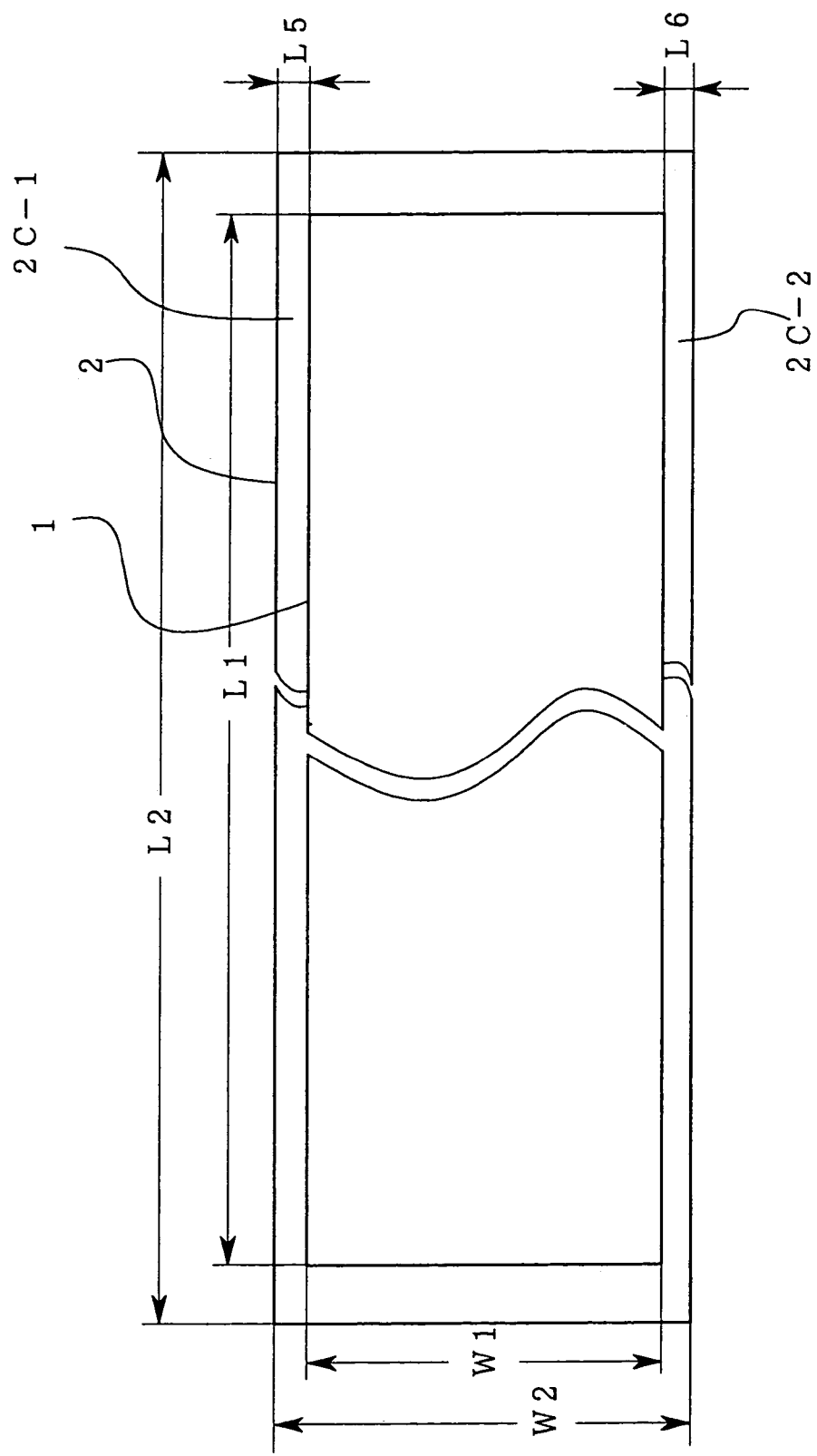
FIG. 2 shows the size and the positional relationship between the belt-shaped positive electrode and the belt-shaped negative electrode constituting the roll shown in FIG. 1.

(b) As shown in FIGS. 1 and 2, in a roll 100, an outermost roll part 2a of a belt-shaped negative electrode 2 is disposed on the further outer periphery of an outermost roll part 1a of a belt-shaped positive electrode 1; a first extrusion part 2A extruding from a free end of an outermost roll part 1a of a belt-shaped positive electrode 1 is formed at a free end of an outermost roll part 2a of a belt-shaped negative electrode 2; an innermost roll part 2b of the belt-shaped negative electrode 2 is disposed on the further inner periphery of an innermost roll part 1b of the belt-shaped positive electrode 1; a second extrusion part 2B extruding from a free end of the innermost roll part 1b of the belt-shaped positive electrode 1 is formed at a free end of the innermost roll part 2b of the belt-shaped negative electrode 2; and a third and a fourth extrusion parts 2C-1 and 2C-2, respectively, are formed on both ends in the width direction of the belt-shaped negative electrode 2, which extrude from both ends in the width direction of the belt-shaped positive electrode 1. FIG. 1 is a cross sectional view of the roll wherein 3 therein shows a solid electrolyte layer. FIG. 2 shows the size and the positional relationship between the belt-shaped positive electrode and the belt-shaped negative electrode, wherein the solid electrolyte layer is omitted.

With this constitution, the number of windings of the belt-shaped negative electrode becomes larger by once than that of the belt-shaped positive electrode, and the parts extruding from the belt-shaped positive electrode are comprised on the outermost periphery, the innermost roll part and both ends in the width direction of the belt-shaped negative electrode. As a result, the amount of lithium ion (lithium ion amount of negative electrode) to be doped in the negative electrode during charging can be increased. Particularly, the lithium ion capacity of the negative electrode at the end surfaces of the width direction and the longitudinal direction of the negative electrode, where lithium ion easily precipitate, can be increased, and more preferable results in the high-rate discharge characteristics can be afforded.

FIGS. 1 and 2 show a roll for a sheet battery having a flat sectional shape. The same effect as mentioned above can be achieved with a roll for can type batteries having a complete round (about complete round) sectional shape, by forming the above-mentioned first to fourth extrusion parts on the belt-shaped negative electrode.

The size of the belt-shaped positive electrode (length L1, width W1), the size of the belt-shaped negative electrode (length L2, width W2), and extrusion lengths L3–L6 of the first to fourth extrusion parts of a roll for sheet batteries having a flat section are preferably set as in the following. L1: 550–650 mm, W1: 35–45 mm, L2: 620–720 mm, W2: 37–47 mm, L3: 1–10 mm, L4: 1–10 mm, L5: 0.5–3 mm, L6: 0.5–3 mm.

The preferable size of the section of a roll having a flat section is major axis of about 20–50 mm and minor axis of about 3–15 mm.

The size of the belt-shaped positive electrode (length, width), the size of the belt-shaped negative electrode (length, width), and extrusion lengths of the first to fourth extrusion parts of a roll for can type batteries having a complete round (about complete round) section as defined using the symbols of the corresponding parts in FIGS. 1 and 2 are preferably set, for example, as in the following.

L1: 550–650 mm, W1: 35–45 mm, L2: 620–720 mm, W2: 37–47 mm, L3: 1–7 mm, L4: 1–7 mm, L5: 0.5–3 mm, L6: 0.5–3 mm.

The preferable size of the section of a roll having a complete round (about complete round) section is diameter of about 10–25 mm.

In the lithium ion polymer secondary battery of the present invention, as various constituent members not mentioned above such as a lid of a battery can, a safety structure, an electrode terminal (lead terminal of sheet battery) and the like, existing items and products to be developed in the future can be used.

The "density (apparent density)" of the porous element comprising a fluoropolymer comprising vinylidene fluoride as a main unit in the present specification was obtained by cutting out 10 cm×10 cm samples from a foamed (porous) film made of this polymer, measuring the volume (V) and weight (W) of the sample under the standard state according to JIS Z 8703 free of compression, and calculating by the following formula (VI). The thickness of the sample was obtained by precisely measuring at 5 different points using a micrometer and taking an average.

$$\text{apparent density (g/cm}^3\text{)}=W/V \tag{VI}$$

The "Gurley value" was measured according to the method described in JIS P 8117 using round samples (specimens) having a diameter of 28.6 mm, which were cut out from a foamed (porous) film made of this polymer.

EXAMPLES

The present invention is explained in more detail in the following by referring to examples. The present invention is not limited in any way by the following examples.

Example 1

[Preparation of Belt-shaped Positive Electrode]

A composition comprising $LiCoO_2$ (91 parts by weight, average particle size: 20 µm, 20/(average particle size [µm]× specific surface area [m$^2$/g]): 7.8) as a positive electrode active material, spherical artificial graphitized carbon (5 parts by weight, average particle size: 6 µm, specific surface area: 3 m$^2$/g) as a conductive material, oil furnace black (1 part by weight, average particle size: 40 nm, specific surface area: 700 m$^2$/g) similarly as a conductive material, and polyvinylidene fluoride (PVdF, 3 parts by weight) as a binder was uniformly dispersed in N-methylpyrrolidone and kneaded to give a slurry.

The above-mentioned slurry was applied onto the both surfaces of an aluminum foil (thickness 20 µm) to be a belt-shaped collector, dried, subjected to a roll-spreading treatment under the roll-spreading conditions of roll-spreading temperature 30° C. and roll-spreading rate 30% to form a positive electrode active material layer having a thickness of 140 µm (total thickness of two positive electrode active material layers formed on the collector 140 µm), which was used as a belt-shaped positive electrode (width: 55 mm, length: 600 mm).

[Preparation of Belt-shaped Negative Electrode]

Fibrous graphitized carbon (95 parts by weight, specific surface area: 1.32 m$^2$/g, spacing of lattice planes: 0.3364 nm, crystallite size in the c-axis direction: 50 nm) to be a negative electrode active material, polyvinylidene fluoride (PVdF) (5 parts by weight) to be a binder, and N-methylpyrrolidone (50 parts by weight) were mixed to give a slurry. This slurry was applied onto the both surfaces of a copper foil (thickness 1 µm) to be a belt-shaped collector, dried, subjected to a roll-spreading treatment under the roll-spreading conditions of roll-spreading temperature 120° C. and roll-spreading rate 20% to give a belt-shaped positive electrode (width: 57 mm, length: 650 mm) having a negative electrode active material layer having a thickness of 150 µm (total thickness of two negative electrode active material layers formed on the collector 150 µm).

[Preparation of Porous Film for Solid Electrolyte Layer]

Polyvinylidene fluoride (PVdF, 30 parts by weight), dimethylformamide (DMF, 170 parts by weight) and n-octanol (35 parts by weight) as a foaming agent were mixed in a screw type blender to give a coating liquid (paste). The coating liquid (paste) was applied to a surface of an Al release substrate with a transcription type applicator at application line speed 1 m/min. The coating film was dried by heating (6 min.) at 160° C. for evaporation of solvent and foaming. The obtained film (thickness 25 µm) was peeled off from the release substrate. The density of the film was 0.82 g/cm$^3$, Gurley value was 35 sec/100 cc. This porous polyvinylidene fluoride (PVdF) film was cut into a belt having a width of 59 mm and a length of 650 mm.

[Preparation of Lithium ion Secondary Battery]

The belt-shaped positive electrode, the belt-shaped negative electrode and the belt-shaped porous polyvinylidene fluoride (PVdF) film prepared above were laminated in the order of the belt-shaped porous polyvinylidene fluoride (PVdF) film, the belt-shaped negative electrode, the belt-shaped porous polyvinylidene fluoride (PVdF) film, and the belt-shaped positive electrode and the laminate was wound with the belt-shaped negative electrode placed inside, whereby a roll having a flat section (major axis of section 30 mm, minor axis of section 3.6 mm) having, at free ends of the innermost roll part and the outermost roll part of a belt-shaped negative electrode, extrusion parts extruding by 5 mm from the free ends of the outermost and innermost roll parts of the belt-shaped positive electrode, and extrusion parts extruding by 1 mm from the both ends in the width direction of the belt-shaped positive electrode, at the both ends in the width direction of the belt-shaped negative electrode.

Then, the above-mentioned roll was immerse in an electrolytic solution comprising $LiPF_6$ dissolved in a mixed solvent of ethylene carbonate (20 vol %), propylene carbonate (10 vol %, ethylmethyl carbonate (60 vol %) and diethyl carbonate (10 vol %) in a concentration of 1.0 mol/L (concentration after preparation) and a belt-shaped porous polyvinylidene fluoride (PVdF) film sandwiched between the positive electrode and the negative electrode was impregnated with the electrolytic solution to allow gellation. Then, this roll was housed in an Al laminate film obtained by laminating a thermoplastic resin, which was an exterior packaging material, on one surface to complete the battery.

The impregnation with the electrolytic solution was performed such that the charge and discharge capacity obtained by actually charging and discharging the battery under the following conditions would show 710 mA (predetermined charge and discharge capacity). The amount of impregnation with the electrolytic solution then was 3.2 g.

[Charge and Discharge Conditions]

After charging with 350 mA current to reach 4.2 V, the current was flown for charging for the total of 4 hrs. while maintaining the constant voltage, and then discharged with 350 mA current until 2.5 V.

Example 2

In the same manner as in Example 1 except that VdF-HFP (vinylidene fluoride-hexafluoropropylene copolymer) was used instead of PVdF and the application line speed of the transcription type applicator was set to ⅔ of that in Example 1, namely, the heating time of the coating film was changed to 9 min., a VdF-HFP porous film (thickness 23 µm) having a density of 0.75 g/cm$^3$ and a Gurley value of 43 sec/100 cc was prepared. In the same manner as in Example 1 except that this VdF-HFP porous film was used instead of the PVdF porous film, a lithium ion secondary battery was prepared. In the same manner as in Example 1, the impregnation amount of the electrolytic solution necessary for achieving the predetermined charge and discharge capacity was measured and found to be 3.1 g. The average distance between the positive electrode and the negative electrode then was 28 µ(thickness of solid electrolyte layers).

Example 3

In the same manner as in Example 1 except that the n-octanol content of the coating liquid (paste) was changed to 32 parts by weight, a PVdF porous film (thickness 24 µm) having a density of 0.81 g/cm$^3$ and a Gurley value of 65 sec/100 cc was prepared. In the same manner as in Example 1 except that this PVdF porous film was used, a lithium ion secondary battery was prepared. In the same manner as in Example 1, the impregnation amount of the electrolytic solution necessary for achieving the predetermined charge and discharge capacity was measured and found to be 2.9 g.

Example 4

In the same manner as in Example 1 except that the dimethylformamide (DMF) content of the coating liquid (paste) was changed to 150 parts by weight, a PVdF porous film (thickness 27 µm) having a density of 0.75 g/cm$^3$ and a Gurley value of 125 sec/100 cc was prepared. In the same manner as in Example 1 except that this PVdF porous film was used, a lithium ion secondary battery was prepared. In the same manner as in Example 1, the impregnation amount of the electrolytic solution necessary for achieving the predetermined charge and discharge capacity was measured and found to be 3.4 g.

Example 5

In the same manner as in Example 1 except that PVdF (6 parts by weight) and VdF-HFP (24 parts by weight) were used instead of PVdF (30 parts by weight), a porous film of a mixture of PVdF and VdF-HFP (thickness 30 µm) having a density of 0.75 g/cm$^3$ and a Gurley value of 140 sec/100 cc was prepared. In the same manner as in Example 1 except that this porous film of a mixture of PVdF and VdF-HFP was used, a lithium ion secondary battery was prepared. In the same manner as in Example 1, the impregnation amount of the electrolytic solution necessary for achieving the predetermined charge and discharge capacity was measured and found to be 3.1 g.

Example 6

In the same manner as in Example 1 except that the amount of PVdF was changed to 25 parts by weight, a PVdF porous film (thickness 18 µm) having a density of 1.20 g/cm$^3$ and a Gurley value of 45 sec/100 cc was prepared. In the same manner as in Example 1 except that this PVdF porous film was used, a lithium ion secondary battery was prepared. In the same manner as in Example 1, the impregnation amount of the electrolytic solution necessary for achieving the predetermined charge and discharge capacity was measured and found to be 2.9 g.

Example 7

In the same manner as in Example 1 except that PVdF (30 parts by weight), DMF (230 parts by weight) and n-octanol (35 parts by weight) were mixed, and the application line speed was set to 1/5, namely, drying by heating for 30 min. was applied, a PVdF porous film (thickness 30 µm) having a density of 0.60 g/cm$^3$ and a Gurley value of 45 sec/100 cc was prepared. In the same manner as in Example 1 except that this PVdF porous film was used, a lithium ion secondary battery was prepared. In the same manner as in Example 1, the impregnation amount of the electrolytic solution necessary for achieving the predetermined charge and discharge capacity was measured and found to be 3.3 g.

Example 8

In the same manner as in Example 1 except that the dimethylformamide (DMF) content of the coating liquid (paste) was set to 230 parts by weight and n-octanol (40 parts by weight) was used, a PVdF porous film (thickness 35 µm) having a density of 0.75 g/cm$^3$ and a Gurley value of 15 sec/100 cc was prepared. In the same manner as in Example 1 except that this PVdF porous film was used, a lithium ion secondary battery was prepared. In the same manner as in Example 1, the impregnation amount of the electrolytic solution necessary for achieving the predetermined charge and discharge capacity was measured and found to be 3.1 g.

Comparative Example 1

In the same manner as in Example 1 except that a polypropylene porous separator (density 0.74 g/cm$^3$, Gurley value 45 sec/100 cc) having a thickness of 25 µm was used instead of the PVdF porous film, a lithium ion secondary battery was prepared. In the same manner as in Example 1, the impregnation amount of the electrolytic solution necessary for achieving the predetermined charge and discharge capacity was measured and found to be 5.8 g.

Comparative Example 2

In the same manner as in Example 1 except that a PVdF porous film (thickness 24 µm) having a density of 1.4 g/cm$^3$ and a Gurley value of 62 sec/100 cc was prepared and this PVdF porous film was used, a lithium ion secondary battery was prepared. In the same manner as in Example 1, the impregnation amount of the electrolytic solution necessary for achieving the predetermined charge and discharge capacity was measured and found to be 2.7 g.

Comparative Example 3

In the same manner as in Example 1 except that a PVdF porous film (thickness 26 µm) having a density of 0.54 g/cm$^3$ and a Gurley value of 3 sec/100 cc was prepared and this PVdF porous film was used, a lithium ion secondary battery was prepared. However, this battery was incapable of charge and discharge due to a short circuit.

Comparative Example 4

In the same manner as in Example 1 except that a PVdF porous film (thickness 24 µm) having a density of 0.77 g/cm$^3$ and a Gurley value of 180 sec/100 cc was prepared and this PVdF porous film was used, a lithium ion secondary battery was prepared. In the same manner as in Example 1, the impregnation amount of the electrolytic solution necessary for achieving the predetermined charge and discharge capacity was measured and found to be 3.4 g.

Comparative Example 5

In the same manner as in Example 1 except that a PVdF porous film (thickness 25 µm) having a density of 0.15 g/cm$^3$ and a Gurley value of 320 sec/100 cc was prepared and this PVdF porous film was used, a lithium ion secondary battery was prepared. In the same manner as in Example 1, the impregnation amount of the electrolytic solution necessary for achieving the predetermined charge and discharge capacity was measured and found to be 2.5 g.

The lithium ion secondary batteries of Examples 1–8 and Comparative Examples 1–5 prepared above were subjected to the following tests.

[Low Temperature Characteristics Test]

After charging at room temperature, the battery is left standing in an atmosphere at −20° C. for 24 hrs. The charging comprised passage of current at IC (600 mA) constant current until voltage reached 4.2 V, followed by passage of current at 4.2 V constant voltage for the total charge time of 2.5 hrs. Then, discharge is conducted at 0.5C (300 mAh)/2.5 V cut off voltage in this atmosphere at −20°

C., and the discharge capacity [mA·H] at this time is determined. In addition, charge and discharge are also conducted under the similar conditions at room temperature (20° C.) and discharge capacity [mA·H] is determined. Further, the discharge capacity at −20° C. was divided by the discharge capacity at room temperature to determine changes in the discharge capacity.

[High-rate Characteristics Test]

2C Discharge was conducted at room temperature (20° C.) and the proportion of the discharge capacity relative to the total capacity was calculated. By the 2C is meant the constant current at 1200 mA relative to the discharge capacity (600 mA) of lithium ion secondary battery.

[Cycle Characteristics Test]

1C/1C Charge and discharge (500 cycles) are conducted at room temperature (20° C.) and discharge capacity [mA·H] is calculated from discharge current and discharge time for 1 cycle and 500 cycles. Then, discharge capacity [mA·H] at 500 cycles was divided by the discharge capacity [mA·H] at 1 cycle to determine changes [%] in the discharge capacity.

These results are shown in the following Tables 1 and 2.

density and Gurley value within the ranges defined in the present invention, was used as a polymer substrate of a solid electrolyte layer showed superior cycle characteristics, low temperature characteristics and high-rate discharge characteristics, as compared to Comparative Examples 2–4 wherein a porous element made of a fluoropolymer comprising vinylidene fluoride as a main unit, which had at least one of a density and a Gurley value outside the range defined in the present invention.

INDUSTRIAL APPLICABILITY

As is clear from the foregoing explanation, according to the present invention, by the use of a porous element made of a fluoropolymer comprising vinylidene fluoride as a main unit, which has a particular density and a particular Gurley value as a polymer substrate of a solid electrolyte layer, a lithium ion polymer secondary battery having strikingly improved low temperature characteristics, cycle characteristics and high-rate discharge characteristics as compared to conventional batteries can be obtained.

TABLE 1

| | Examples | | | | | | | |
|---|---|---|---|---|---|---|---|---|
| | 1 | 2 | 3 | 4 | 5 | 6 | 7 | 8 |
| polymer substrate of solid electrolyte layer | PVdF | VdF-HFP | PVdF | PVdF | PVdF&VdF-HFP | PVdF | PVdF | PVdF |
| density (g/cm$^3$) of porous film | 0.82 | 0.75 | 0.81 | 0.75 | 0.75 | 1.20 | 0.60 | 0.75 |
| Gurley value (sec/100 cc) of porous film | 35 | 43 | 65 | 125 | 140 | 45 | 45 | 15 |
| amount (g) of electrolytic solution to obtain predetermined charge and discharge capacity | 3.2 | 3.1 | 2.9 | 3.4 | 3.1 | 2.9 | 3.3 | 3.1 |
| cycle characteristics (%) | 79 | 78 | 76 | 77 | 72 | 75 | 76 | 70 |
| low temperature characteristics (−20° C., 1C) (%) | 81 | 80 | 75 | 74 | 80 | 79 | 79 | 83 |
| high-rate characteristics (2C) (%) | 95 | 97 | 96 | 95 | 96 | 95 | 94 | 97 |

TABLE 2

| | Comparative Examples | | | | |
|---|---|---|---|---|---|
| | 1 | 2 | 3 | 4 | 5 |
| polymer substrate of solid electrolyte layer (separator) | PE | PVdF | PVdF | PVdF | PVdF |
| density (g/cm$^3$) of porous film | 0.74 | 1.40 | 0.54 | 0.77 | 0.15 |
| Gurley value (sec/100 cc) of porous film | 45 | 62 | 3 | 180 | 320 |
| amount (g) of electrolytic solution to obtain predetermined charge and discharge capacity | 5.8 | 2.7 | Discharge unavailable due to short circuit | 3.4 | 2.5 |
| cycle characteristics (%) | 45 | 52 | | 70 | 30 |
| low temperature characteristics (−20° C., 1C) (%) | 48 | 12 | | 15 | Unknown |
| high-rate characteristics (2C) (%) | 73 | 70 | | 80 | 38 |

From Tables 1 and 2, it is evident that Examples 1–8 wherein a porous element made of a fluoropolymer comprising vinylidene fluoride as a main unit, which has a This application is based on patent application Nos. 395543/2000 and 386624/2001 filed in Japan, the contents of which are hereby incorporated by reference.

What is claimed is:

1. A lithium ion polymer secondary battery comprising a positive electrode, a negative electrode and a solid electrolyte layer comprising a porous element comprising a fluoropolymer comprising vinylidene fluoride as a main unit and having a density of 0.55–1.30 g/cm$^3$ and a Gurley value of 35–50 sec/100 cc, a salt and a compatible solvent comprising a mixture of ethylene carbonate, propylene carbonate, ethylmethyl carbonate, and diethyl carbonate, which is disposed between the positive electrode and the negative electrode.

2. The lithium ion polymer secondary battery of claim 1, wherein the salt is at least one kind of compound selected from LiClO$_4$, LiBF$_4$, LiPF$_6$, LiAsF$_6$, LiCF$_3$SO$_3$, LiAlCl$_4$ and Li(CF$_3$SO$_2$)$_2$N.

3. The lithium ion polymer secondary battery of claim 1, wherein the positive electrode active material is a Li-transition metal composite oxide.

4. The lithium ion polymer secondary battery of claim 2, wherein the positive electrode active material is a Li-transition metal composite oxide.

5. The lithium ion polymer secondary battery of claim 1, wherein the negative electrode active material is a graphite.

6. The lithium ion polymer secondary battery of claim 2, wherein the negative electrode active material is a graphite.

7. The lithium ion polymer secondary battery of claim 3, wherein the negative electrode active material is a graphite.

8. The lithium ion polymer secondary battery of claim 4, wherein the negative electrode active material is a graphite.

9. The lithium ion polymer secondary battery of claim 1, wherein
the positive electrode is a belt-shaped positive electrode comprising positive electrode active material layers, which comprise an active material and a conductive material, formed on both surfaces of a belt-shaped collector,
the negative electrode is a belt-shaped negative electrode comprising negative electrode active material layers formed on both surfaces of a belt-shaped collector, and
these belt-shaped positive electrode and belt-shaped negative electrode and the solid electrolyte layer having a belt shape and being interposed between said electrodes are spirally wound to constitute a roll, wherein
the total thickness A of the positive electrode active material layers formed on both surfaces of the belt-shaped collector of said belt-shaped positive electrode and the total thickness B of the negative electrode active material layers formed on both surfaces of the belt-shaped collector of said belt-shaped negative electrode are each 80 μm–250 μm, and
the ratio (A/B) of the total thickness A to the total thickness B is 0.4–2.2.

10. The lithium ion polymer secondary battery of claim 2, wherein
the positive electrode is a belt-shaped positive electrode comprising positive electrode active material layers, which comprise an active material and a conductive material, formed on both surfaces of a belt-shaped collector,
the negative electrode is a belt-shaped negative electrode comprising negative electrode active material layers formed on both surfaces of a belt-shaped collector, and
these belt-shaped positive electrode and belt-shaped negative electrode and the solid electrolyte layer having a belt shape and being interposed between said electrodes are spirally wound to constitute a roll, wherein
the total thickness A of the positive electrode active material layers formed on both surfaces of the belt-shaped collector of said belt-shaped positive electrode and the total thickness B of the negative electrode active material layers formed on both surfaces of the belt-shaped collector of said belt-shaped negative electrode are each 80 μm–250 μm, and
the ratio (A/B) of the total thickness A to the total thickness B is 0.4–2.2.

11. The lithium ion polymer secondary battery of claim 3, wherein
the positive electrode is a belt-shaped positive electrode comprising positive electrode active material layers, which comprise an active material and a conductive material, formed on both surfaces of a belt-shaped collector,
the negative electrode is a belt-shaped negative electrode comprising negative electrode active material layers formed on both surfaces of a belt-shaped collector, and
these belt-shaped positive electrode and belt-shaped negative electrode and the solid electrolyte layer having a belt shape and being interposed between said electrodes are spirally wound to constitute a roll, wherein
the total thickness A of the positive electrode active material layers formed on both surfaces of the belt-shaped collector of said belt-shaped positive electrode and the total thickness B of the negative electrode active material layers formed on both surfaces of the belt-shaped collector of said belt-shaped negative electrode are each 80 μm–250 μm, and
the ratio (A/B) of the total thickness A to the total thickness B is 0.4–2.2.

12. The lithium ion polymer secondary battery of claim 4, wherein
the positive electrode is a belt-shaped positive electrode comprising positive electrode active material layers, which comprise an active material and a conductive material, formed on both surfaces of a belt-shaped collector,
the negative electrode is a belt-shaped negative electrode comprising negative electrode active material layers formed on both surfaces of a belt-shaped collector, and
these belt-shaped positive electrode and belt-shaped negative electrode and the solid electrolyte layer having a belt shape and being interposed between said electrodes are spirally wound to constitute a roll, wherein
the total thickness A of the positive electrode active material layers formed on both surfaces of the belt-shaped collector of said belt-shaped positive electrode and the total thickness B of the negative electrode active material layers formed on both surfaces of the belt-shaped collector of said belt-shaped negative electrode are each 80 μm–250 μm, and
the ratio (A/B) of the total thickness A to the total thickness B is 0.4–2.2.

13. The lithium ion polymer secondary battery of claim 5, wherein
the positive electrode is a belt-shaped positive electrode comprising positive electrode active material layers, which comprise an active material and a conductive material, formed on both surfaces of a belt-shaped collector,
the negative electrode is a belt-shaped negative electrode comprising negative electrode active material layers formed on both surfaces of a belt-shaped collector, and
these belt-shaped positive electrode and belt-shaped negative electrode and the solid electrolyte layer having a belt shape and being interposed between said electrodes are spirally wound to constitute a roll, wherein
the total thickness A of the positive electrode active material layers formed on both surfaces of the belt-shaped collector of said belt-shaped positive electrode and the total thickness B of the negative electrode active material layers formed on both surfaces of the belt-shaped collector of said belt-shaped negative electrode are each 80 μm–250 μm, and
the ratio (A/B) of the total thickness A to the total thickness B is 0.4–2.2.

14. The lithium ion polymer secondary battery of claim 6, wherein
the positive electrode is a belt-shaped positive electrode comprising positive electrode active material layers, which comprise an active material and a conductive material, formed on both surfaces of a belt-shaped collector,
the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between said electrodes are spirally wound to constitute a roll, wherein the total thickness A of the positive electrode active material layers formed on both surfaces of the belt-shaped collector of said belt-shaped positive electrode and the total thickness B of the negative electrode active material layers formed on both surfaces of the belt-shaped collector of said belt-shaped negative electrode are each 80 μm–250 μm, and the ratio (A/B) of the total thickness A to the total thickness B is 0.4–2.2.

15. The lithium ion polymer secondary battery of claim 7, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between said electrodes are spirally wound to constitute a roll, wherein the total thickness A of the positive electrode active material layers formed on both surfaces of the belt-shaped collector of said belt-shaped positive electrode and the total thickness B of the negative electrode active material layers formed on both surfaces of the belt-shaped collector of said belt-shaped negative electrode are each 80 μm–250 μm,and the ratio (A/B) of the total thickness A to the total thickness B is 0.4–2.2.

16. The lithium ion polymer secondary battery of claim 8, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between said electrodes are spirally wound to constitute a roll, wherein the total thickness A of the positive electrode active material layers formed on both surfaces of the belt-shaped collector of said belt-shaped positive electrode and the total thickness B of the negative electrode active material layers formed on both surfaces of the belt-shaped collector of said belt-shaped negative electrode are each 80 μm–250 μm,and the ratio (A/B) of the total thickness A to the total thickness B is 0.4–2.2.

17. The lithium ion polymer secondary battery of claim 1, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of said belt-shaped negative electrode is disposed on a still outer periphery of the outermost roll part of said belt-shaped positive electrode, and a first extrusion part extruding from a free end of the outermost roll part of said belt-shaped positive electrode is formed on a free end of the outermost roll part of said belt-shaped negative electrode, an innermost roll part of said belt-shaped negative electrode is disposed on a still inner periphery of the innermost roll part of said belt-shaped positive electrode and a second extrusion part extruding from a free end of the innermost roll part of said belt-shaped positive electrode is formed on a free end of the innermost roll part of said belt-shaped negative electrode, and a third and a fourth extrusion parts extruding from both ends in the width direction of said belt-shaped positive electrode are respectively formed on both ends in the width direction of said belt-shaped negative electrode.

18. The lithium ion polymer secondary battery of claim 2, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of said belt-shaped negative electrode is disposed on a still outer periphery of the outermost roll part of said belt-shaped positive electrode, and a first extrusion part extruding from a free end of the outermost roll part of said belt-shaped positive electrode is formed on a free end of the outermost roll part of said belt-shaped negative electrode, an innermost roll part of said belt-shaped negative electrode is disposed on a still inner periphery of the innermost roll part of said belt-shaped positive electrode and a second extrusion part extruding from a free end of the innermost roll part of said belt-shaped positive electrode is formed on a free end of the innermost roll part of said belt-shaped negative electrode, and a third and a fourth extrusion parts extruding from both ends in the width direction of said belt-shaped positive electrode are respectively formed on both ends in the width direction of said belt-shaped negative electrode.

19. The lithium ion polymer secondary battery of claim 3, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of said belt-shaped negative electrode is disposed on a still outer periphery of the outermost roll part of said belt-shaped positive electrode, and a first extrusion part extruding from a free end of the outermost roll part of said belt-shaped positive electrode is formed on a free end of the outermost roll part of said belt-shaped negative electrode, an innermost roll part of said belt-shaped negative electrode is disposed on a still inner periphery of the innermost roll part of said belt-shaped positive electrode and a second extrusion part extruding from a free end of the innermost roll part of said belt-shaped positive electrode is formed on a free end of the innermost roll part of said belt-shaped negative electrode, and a third and a fourth extrusion parts extruding from both ends in the width direction of said belt-shaped positive electrode are respectively formed on both ends in the width direction of said belt-shaped negative electrode.

20. The lithium ion polymer secondary battery of claim 4, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of said belt-shaped negative electrode is disposed on a still outer periphery of the outermost roll part of said belt-shaped positive electrode, and a first extrusion part extruding from a free end of the outermost roll part of said belt-shaped positive electrode is formed on a free end of the outermost roll part of said belt-shaped negative electrode, an innermost roll part of said belt-shaped negative electrode is disposed on a still inner periphery of the innermost roll part of said belt-shaped positive electrode and a second extrusion part extruding from a free end of the innermost roll part of said belt-shaped positive electrode is formed on a free end of the innermost roll part of said belt-shaped negative electrode, and a third and a fourth extrusion parts extruding from both ends in the width direction of said belt-shaped positive electrode are respectively formed on both ends in the width direction of said belt-shaped negative electrode.

21. The lithium ion polymer secondary battery of claim 5, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of said belt-shaped negative electrode is disposed on a still outer periphery of the outermost roll part of said belt-shaped positive electrode, and a first extrusion part extruding from a free end of the outermost roll part of said belt-shaped positive electrode is formed on a free end of the outermost roll part of said belt-shaped negative electrode, an innermost roll part of said belt-shaped negative electrode is disposed on a still inner periphery of the innermost roll part of said belt-shaped positive electrode and a second extrusion part extruding from a free end of the innermost roll part of said belt-shaped positive electrode is formed on a free end of the innermost roll part of said belt-shaped negative electrode, and a third and a fourth extrusion parts extruding from both ends in the width direction of said belt-shaped positive electrode are respectively formed on both ends in the width direction of said belt-shaped negative electrode.

22. The lithium ion polymer secondary battery of claim 6, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of said belt-shaped negative electrode is disposed on a still outer periphery of the outermost roll part of said belt-shaped positive electrode, and a first extrusion part extruding from a free end of the outermost roll part of said belt-shaped positive electrode is formed on a free end of the outermost roll part of said belt-shaped negative electrode, an innermost roll part of said belt-shaped negative electrode is disposed on a still inner periphery of the innermost roll part of said belt-shaped positive electrode and a second extrusion part extruding from a free end of the innermost roll part of said belt-shaped positive electrode is formed on a free end of the innermost roll part of said belt-shaped negative electrode, and a third and a fourth extrusion parts extruding from both ends in the width direction of said belt-shaped positive electrode are respectively formed on both ends in the width direction of said belt-shaped negative electrode.

23. The lithium ion polymer secondary battery of claim 7, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of said belt-shaped negative electrode is disposed on a still outer periphery of the outermost roll part of said belt-shaped positive electrode, and a first extrusion part extruding from a free end of the outermost roll part of said belt-shaped positive electrode is formed on a free end of the outermost roll part of said belt-shaped negative electrode, an innermost roll part of said belt-shaped negative electrode is disposed on a still inner periphery of the innermost roll part of said belt-shaped positive electrode and a second extrusion part extruding from a free end of the innermost roll part of said belt-shaped positive electrode is formed on a free end of the innermost roll part of said belt-shaped negative electrode, and a third and a fourth extrusion parts extruding from both ends in the width direction of said belt-shaped positive electrode are respectively formed on both ends in the width direction of said belt-shaped negative electrode.

24. The lithium ion polymer secondary battery of claim 8, wherein the positive electrode is a belt-shaped positive electrode comprising positive electrode active material layers, which comprise an active material and a conductive material, formed on both surfaces of a belt-shaped collector, the negative electrode is a belt-shaped negative electrode comprising negative electrode active material layers formed on both surfaces of a belt-shaped collector, and these belt-shaped positive electrode and belt-shaped negative electrode and the solid electrolyte layer having a belt shape and being interposed between the electrodes are spirally wound to constitute a roll, wherein an outermost roll part of said belt-shaped negative electrode is disposed on a still outer periphery of the outermost roll part of said belt-shaped positive electrode, and a first extrusion part extruding from a free end of the outermost roll part of said belt-shaped positive electrode is formed on a free end of the outermost roll part of said belt-shaped negative electrode, an innermost roll part of said belt-shaped negative electrode is disposed on a still inner periphery of the innermost roll part of said belt-shaped positive electrode and a second extrusion part extruding from a free end of the innermost roll part of said belt-shaped positive electrode is formed on a free end of the innermost roll part of said belt-shaped negative electrode, and a third and a fourth extrusion parts extruding from both ends in the width direction of said belt-shaped positive electrode are respectively formed on both ends in the width direction of said belt-shaped negative electrode.

* * * * *